United States Patent
Desch et al.

(10) Patent No.: US 11,052,867 B1
(45) Date of Patent: Jul. 6, 2021

(54) DEDICATED EMERGENCY SEATBELT HINGE

(71) Applicants: James Desch, ShellKnob, MO (US); Carol Desch, ShellKnob, MO (US)

(72) Inventors: James Desch, ShellKnob, MO (US); Carol Desch, ShellKnob, MO (US)

( * ) Notice: Subject to any disclaimer, the term of this patent is extended or adjusted under 35 U.S.C. 154(b) by 442 days.

(21) Appl. No.: 15/936,054

(22) Filed: Mar. 26, 2018

(51) Int. Cl.
*B60R 22/32* (2006.01)
*A44B 11/25* (2006.01)

(52) U.S. Cl.
CPC .................. *B60R 22/32* (2013.01)

(58) Field of Classification Search
CPC . A44B 11/25; A44B 11/2561; A44B 11/2553; A44B 11/2584; A44B 11/2596; A44B 11/26; A44B 11/263; B60R 22/32
See application file for complete search history.

(56) References Cited

U.S. PATENT DOCUMENTS

| 5,632,701 A | * | 5/1997 | Neel ...................... B65G 17/08 24/33 B |
| 2012/0205223 A1 | * | 8/2012 | Moeschen-Siekmann ................... F16G 3/09 198/844.2 |

FOREIGN PATENT DOCUMENTS

| CH | 596013 | * | 2/1978 | ............. B60R 22/32 |
| EP | 0318376 A1 | * | 5/1989 | ............. B60R 22/32 |
| EP | 0412942 A1 | * | 2/1991 | ......... A44B 11/2561 |
| FR | 2363337 A1 | * | 3/1978 | ............. B60R 22/32 |
| FR | 2468382 A1 | * | 5/1981 | ............. B60R 22/32 |

OTHER PUBLICATIONS

Machine Translation of CH596013, worldwide.espacenet.com; created Nov. 11, 2020.*

* cited by examiner

*Primary Examiner* — Daniel J Wiley
(74) *Attorney, Agent, or Firm* — Gugliotta & Gugliotta LPA

(57) ABSTRACT

An emergency secondary release system is provided. The seatbelt's lap belt section is split into a lower belt section and an upper belt section. A release latch upper section terminates the lower belt section. A release latch lower section terminates the upper belt section. A connection mechanism in the form of a connection pin, cotter pin, hitch pin or clevis pin releasably connects the release latch upper section to said release latch lower section. The instant abstract is neither intended to define the invention disclosed in this specification nor intended to limit the scope of the invention.

15 Claims, 5 Drawing Sheets

DEDICATED EMERGENCY SEATBELT HINGE

RELATED APPLICATIONS

There are no previously filed nor currently any co-pending applications anywhere in the world.

BACKGROUND OF THE INVENTION

1. Field of the Invention

The present invention relates generally to seat belts and seat belt buckles and, more particularly, to a seat belt secondary release mechanism for use during emergencies.

2. Description of the Related Art

Seatbelts, invented in the late 1800's, were originally envisioned as a belt used to keep pilots inside of gliders.[1] In 1885, the belt was adapted to secure New York City tourists and keep them safe inside of taxis.[2] Ever since, the oft-overlooked strap has been saving lives.

Horrifically, automobile crashes are the single largest cause of death for Americans aged 1-54, with most of those deaths occurring to a vehicle's occupants.[2] In 2015 alone, 22,441 Americans died in traffic crashes while being occupants in a passenger vehicle.[2] More broadly, 2.5 million drivers and passengers were treated in emergency rooms across the nation with injuries stemming from traffic crashes in 2015.[2] Traffic crashes can be catastrophic, even when the occupants do not die—in fact, during 2010 alone more than $48 billion in lifetime medical and loss of wage costs were incurred by drivers and passengers in non-fatal traffic crashes.[2]

It is estimated that seatbelts significantly reduce the risk of fatal injury to car occupants sitting in the front seat—in fact, seatbelt use reduces the fatality rate for such people by a staggering 45%.[3] Seatbelt use similarly reduced the risk of moderate-to-severe non-fatal injury by 50%.[3] For drivers and passengers of light-truck style automobiles, seat belt use reduced the fatality rate by 60% and the non-fatal, moderate-to-severe injury rate by 65%.[3]

This is because seatbelts are especially effective in preventing ejections from a vehicle; such ejections are the most damaging possibility in a traffic crash.[3] In 2015, approximately 80% of car occupants who were ejected from the car died.[3] Only 1% of the occupants reported to have been wearing a seatbelt were actually ejected from the vehicle during 2015.[3] It is estimated that seatbelts saved as many as 14,000 lives in 2015 alone.[4]

Despite the clear life-saving abilities of seat belts, some people still refuse to use the harnesses. Young adults aged 18-24 are less likely than any other demographic to wear seatbelts.[5] Indeed, between 52-59% of teenagers, aged 13-19, and adults aged 20-44 who died in traffic crashes in 2015 were not wearing a seatbelt at the time of the crash.[2] American men use seat belts less often than American women,[5] and combined only about 88.5% of drivers and front seat passengers regularly wear their seatbelts.[6]

If seatbelt use is indeed, as the CDC proclaims it to be, one of the century's defining public health achievements, why don't more people use them?[7] Among a myriad of misguided rationales, some people fear that, in the event of a horrific traffic crash, their seatbelt would trap them inside of the car in the event of submersion or fire, potentially resulting in their death.[8,9] Further, given that the only release latch that exists on current automobile vehicles is positioned on the inboard side, a first responder is further unable to access the release in the event that the occupant of the vehicle is unable to move or otherwise assist.

Many products, both for consumers as well as for industrial use by professional first responders, exist to facilitate the cutting of seatbelt. Many such seatbelt cutters are combine with glass breakers. Currently, these products are often an all-in-one solution, providing a free-floating apparatus that allows the user to cut through the tough webbed seatbelt material and then easily break the car's windows for an easier escape. However, these items are not attached to nor built in to the seatbelt in a manner that would make them easily accessible in the case of an accident. Instead, they are generally simply placed somewhere within the car, such as in the center console, or the g love box, or under the driver's seat. This means that, in the event of an emergency, the seatbelt cutter might not be within reach or may have dislodged into an inaccessible location. This is a critical and potentially fatal design flaw.

It is preferable that a vehicle's seatbelt be adapted and modified to provide an alternate, outboard side release mechanism mounted between the seatbelt and the seatbelt anchor. Such a secondary seatbelt release would allow for easy accessible in an emergency situation and would not interfere with the original seatbelt operation.

SUMMARY OF THE INVENTION

It is thus an object of the present invention to provide a secondary seatbelt release mechanism.

It is a feature of the present invention to place a fixed apparatus mounted between the seatbelt and the seatbelt anchor (opposite the seatbelt latch) to allow for an emergency secondary release when activated in order to free the occupant from restraint.

It is a feature of the present invention to have such an emergency secondary release mounted to the seatbelt in a fixed position, such that it remains stationary in the event of an accident while being easily located by a vehicle's occupant or by an accident first responder.

It is a feature of the present invention to have a release lever which the user can slide or articulate from a locked position that would thereby allow for release of a connection pin, thereby freeing the seatbelt from the user without having to access the existing seatbelt primary latch.

The present invention provides a system and method for releasing an otherwise buckled seatbelt. An emergency secondary release system is provided. The seatbelt's lap belt section is split into a lower belt section and an upper belt section. A release latch upper section terminates the lower belt section. A release latch lower section terminates the upper belt section. A connection mechanism in the form of a connection pin, cotter pin, hitch pin or clevis pin releasably connects the release latch upper section to said release latch lower section. The release latch upper section attaches to a first seat belt segment distally from the lower seatbelt anchor. The release latch lower section attaches to a second seat belt segment proximally from the seatbelt buckle. A first retainer bar affixed to the first seat belt segment, and a first connection bracket circumscribes the first seat belt segment and forms a first retainer receiving orifice for mechanically fastening to the retainer bar. A second retainer bar affixes to the second seat belt segment and a second connection bracket circumscribes the second seat belt segment and forms a second retainer receiving orifice. The retainer bar are secured within their respective retainer receiving orifice with mechanical fasteners such as set screws. Connection protuberances that extend cantilevered from each connection bracket and are co-ordinated to interact and nest. A connection mechanism is adapted so as to provide a removable connection between the upper connection protuberances and the lower connection protuberances.

A key advantage of the present invention is to provide for an secondary emergency seatbelt removal hinge that does not interfere with the functionality of the existing seat belt buckle. Further objects, features, elements and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
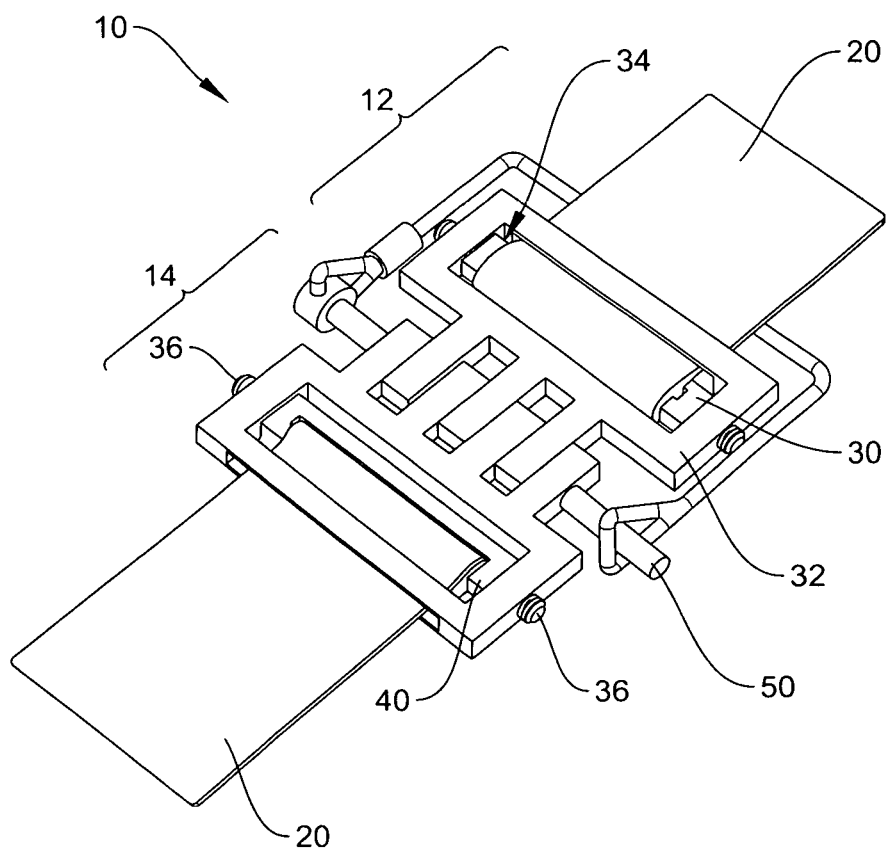
FIG. 1 depicts a front perspective view of an emergency secondary release system according to the preferred embodiment of the present invention.
Figure 2:
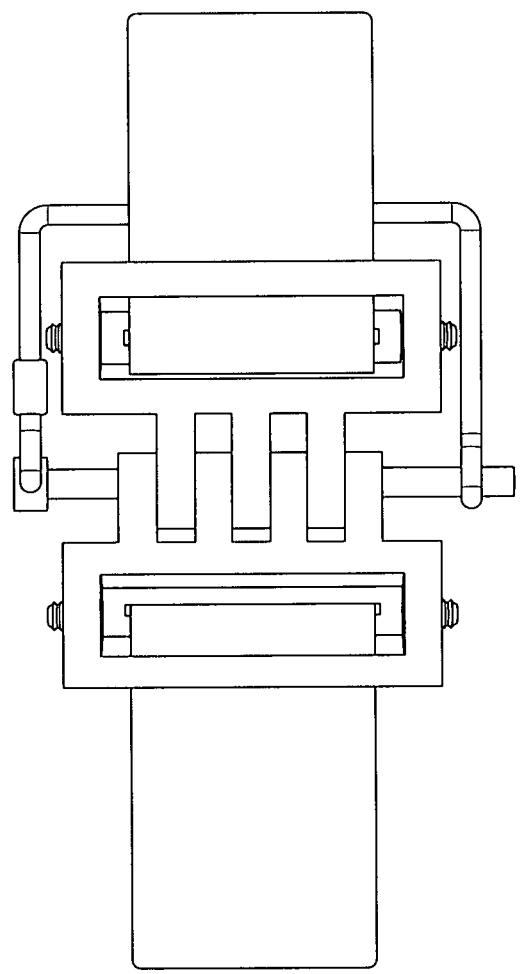
FIG. 2 is a top plan view thereof.
Figure 3:
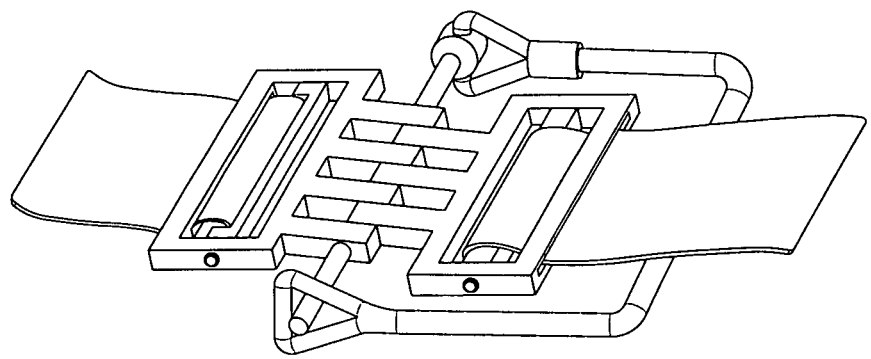
FIG. 3 is a lower side perspective view thereof.
Figure 4:
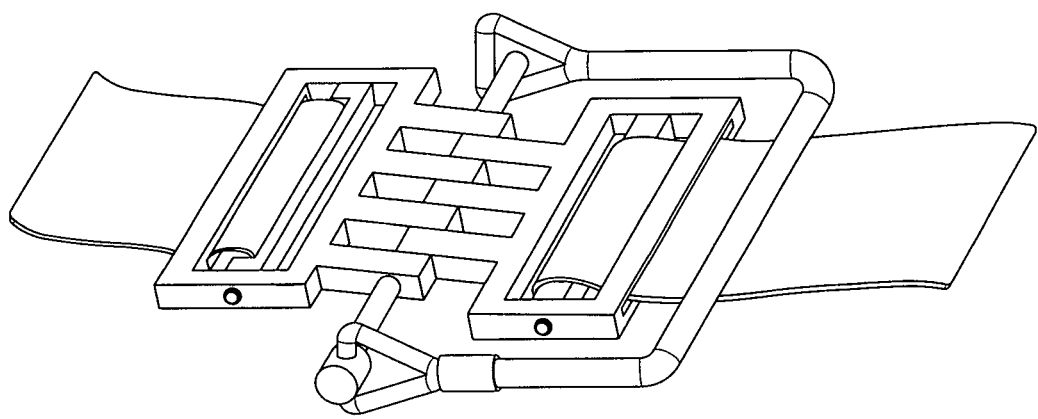
FIG. 4 is an upper side perspective view thereof.
Figure 5:
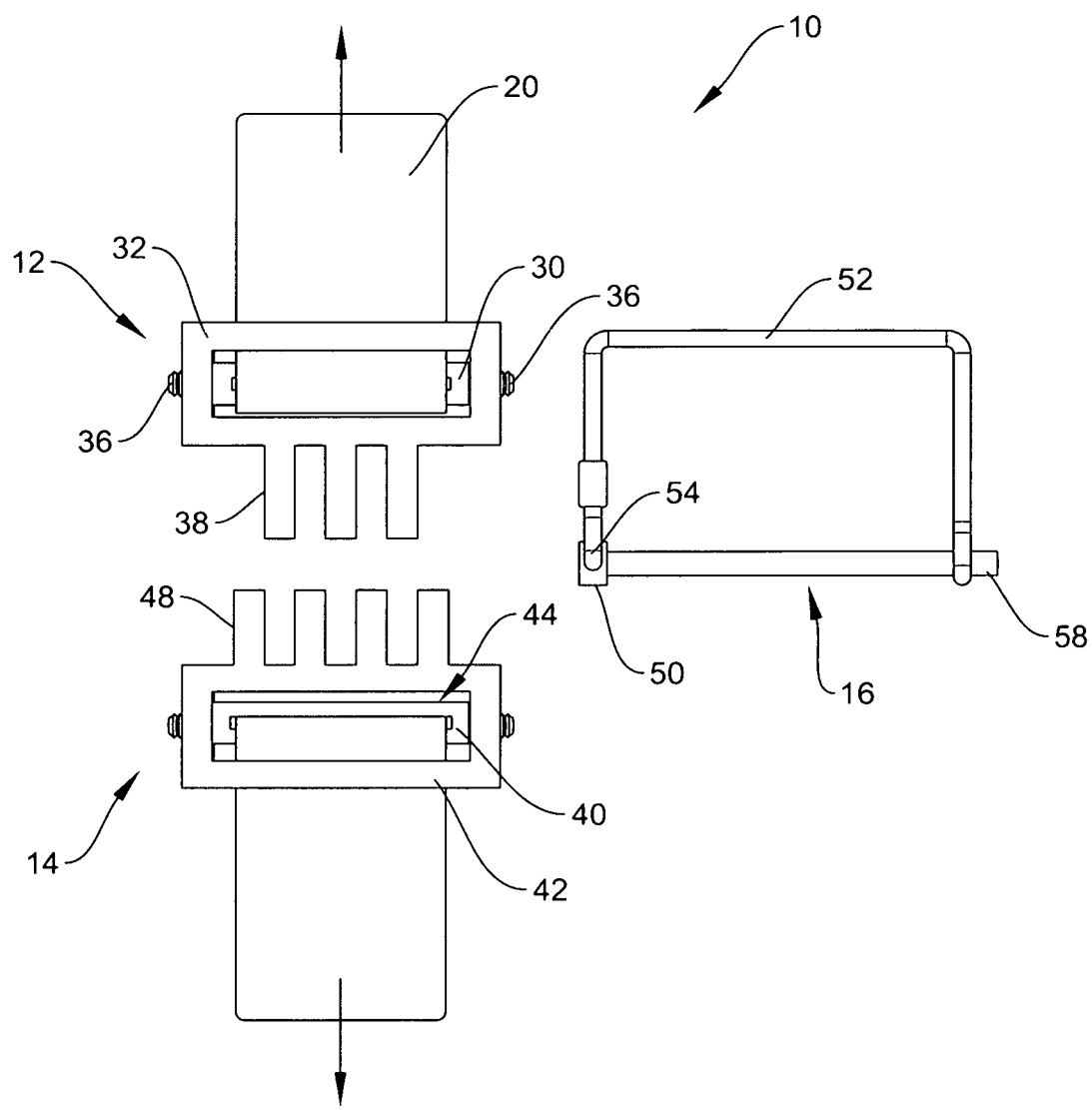
FIG. 5 is a partially exploded top plan view thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, an emergency secondary release system, generally noted as 10, is shown according to the preferred embodiment of the present invention. The release system 10 consist essentially of three basic interactive elements: a lease latch upper section 12; a release latch lower section 14; and a connection mechanism 16.

The release latch upper section 12 is provided for attachment to an otherwise conventional seat belt 20. It is intended that an existing seatbelt 20 be separated at a position between the lower seatbelt anchors (not shown) such that the upper latch section 12 may be affixed to terminate one end of the seatbelt segment 20. The upper section 12 includes a first retainer bar 30 that is rigidly affixed to the seat belt segment 20. The upper section 12 further includes a first connection bracket 32 forming a first retainer receiving orifice 34. The retainer bar 30 is thereby secured within the orifice 24 by means of one or more mechanical fasteners, shown here as set screws 36. The retainer bar 30 may be provided having a slots built in to prevent it from turning should the set screws 36 become loose. The connection bracket 32 further includes one or more upper connection protuberances 38 that extend cantilevered upward from the bracket 32.

The release latch lower section 14 is similarly provided for attachment to an otherwise conventional seat belt 20. The lower latch section 14 may thereby be affixed to terminate the opposite end of the seatbelt segment 20. The lower section 14 includes a second retainer bar 40 that is rig idly affixed to the seat belt segment 20. The lower section 12 further includes a second connection bracket 42 forming a second retainer receiving orifice 44. The retainer bar 40 is thereby secured within the orifice 44 by means of one or more mechanical fasteners, shown here as set screws 36. The set screws 36 are shown for clarity extended from the outer surface of the associated connection bracket; however, it is intended that such set screws 36 would be threaded in to a recessed position. The retainer bar 40 may be provided having a slots built in to prevent it from turning should the set screws 36 become loose. The connection bracket 42 further includes one or more lower connection protuberances 48 that extend cantilevered downward from the bracket 42.

The upper connection protuberances 38 and the lower connection protuberances 48 are coordinated to interact and nest.

The connection mechanism 16 is thereby adapted so as to provide a removable connection between the upper connection protuberances 38 and the lower connection protuberances 48. The connection mechanism 16 may include a connection pin 50 as a cotter pin, hitch pin, clevis pin or similar mechanical connection that provides for a removable hinge between the connection protuberances 38, 48. A wire lock 52 may be pivotally affixed 54 to one end of the pin 50 and locked through impingement when connected to the oppose end 58 of the pin 50.

The connection mechanism 16 can thereby be affixed to the interacted and nested protuberances 38, 48, and when removed will allow the upper section 12 to be removed from the lower section 14.

2. Operation of the Preferred Embodiment

Existing seatbelts have several major flaws, including: a belt will lock down in an accident and will not release until pressure is released; the existing latch location is on an inboard side only, away from the doors or windows, and are difficult to access by rescue personnel; and, while fixed at three separate locations there is only one release point. The present invention provides a back-up release point that can be incorporated within new seat belts, or added to existing seat belts in any type of vehicle, as well as other seatbelt applications such as with carnival rides. In operation, the seatbelt 20 can be adapted to bifurcate the belt to allow the lease latch upper section 12 and release latch lower section 14 to be attached thereto. According to one aspect of the present invention, such an adaptation may be accomplished through the modification of existing seat belt devices. According to another aspect of the present invention, such an adaptation may be provides as part of an original equipment seat belt assembly provided with new vehicles or equipment. In any aspect the connection mechanism 16 solves those existing seatbelts flaws, namely, by providing a secondary emergency release point that will release while tension is on the seatbelt at the outboard side.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. An emergency secondary release system for use in a seat belt having a lap belt section terminating at one end at a seat belt anchor and terminating at an opposite end at a seat belt buckle, said system comprising:
    said lap belt section being bifurcated into a lower belt section and an upper belt section;
    a release latch upper section terminating at a distal end of said lower belt section;
    a release latch lower section terminating at a proximal end of said upper belt section;
    a connection mechanism for releasably connecting said release latch upper section to said release latch lower section;
    wherein said release latch upper section further comprises:
    a first retainer bar affixed to a first seat belt segment of the seat belt attached to said release latch upper section;
    a first connection bracket circumscribing said first seat belt segment and forming a first retainer receiving orifice; and
    said retainer bar secured within said first retainer receiving orifice with mechanical fasteners.

2. The emergency secondary release system of claim 1, wherein said mechanical fasteners comprise at least one set screw.

3. The emergency secondary release system of claim 1, wherein said release latch lower section further comprises:
    a second retainer bar affixed to a second seat belt segment of the seat belt attached to said release latch lower section;
    a second connection bracket circumscribing said second seat belt segment and forming a second retainer receiving orifice; and
    said second retainer bar secured within said second retainer receiving orifice with mechanical fasteners.

4. The emergency secondary release system of claim 3, wherein said mechanical fasteners comprise at least one set screw.

5. The emergency secondary release system of claim 3, wherein said first connection bracket further comprises one or more upper connection protuberances that extend cantilevered upward from said first connection bracket.

6. The emergency secondary release system of claim 5, wherein said second connection bracket further comprises one or more lower connection protuberances that extend cantilevered downward from said second connection bracket;
    wherein said upper connection protuberances and the lower connection protuberances are coordinated to interact and nest.

7. The emergency secondary release system of claim 6, wherein said connection mechanism is adapted so as to provide a removable connection between the upper connection protuberances and the lower connection protuberances.

8. The emergency secondary release system of claim 7, wherein said connection mechanism provides a removable hinge between the upper connection protuberances and the lower connection protuberances in a manner that affixes the interacted and nested protuberances and when removed will allow the upper section to be removed from the lower section.

9. The emergency secondary release system of claim 8, wherein said connection mechanism further is selected from a group comprising: a connection pin; a cotter pin; a hitch pin; and a clevis pin.

10. A method for providing an emergency release from a seat belt having a lap belt section terminating at one end at a seat belt anchor and termination at an opposite end at a seat belt buckle, said method comprising:
    splitting the lap belt section into a lower belt section and an upper belt section;
    connecting a release latch upper section to a distal end of said lower belt section;

connecting a release latch lower section to a proximal end of said upper belt section; and connecting the release latch upper section to the release latch lower section with a releasable connecting mechanism, wherein said release latch upper section comprises:

a first retainer bar affixed to a first seat belt segment of the seat belt attached to said release latch upper section;

a first connection bracket circumscribing said first seat belt segment and forming a first retainer receiving orifice; and said first retainer bar secured within said first retainer receiving orifice with mechanical fasteners; and said release latch lower section comprises:

a second retainer bar affixed to a second seat belt segment of the seat belt attached to said release latch lower section;

a second connection bracket circumscribing said second seat belt segment and forming a second retainer receiving orifice; and said second retainer bar secured within said second retainer receiving orifice with mechanical fasteners.

11. The method of claim 10, wherein said mechanical fasteners comprise at least one set screw.

12. The method of claim 11, wherein:

said first connection bracket further comprises one or more upper connection protuberances that extend cantilevered upward from said first connection bracket; and said second connection bracket further comprises one or more lower connection protuberances that extend cantilevered downward from said second connection bracket; and said upper connection protuberances and the lower connection protuberances are coordinated to interact and nest.

13. The method of claim 12, wherein said connection mechanism is adapted so as to provide a removable connection between the upper connection protuberances and the lower connection protuberances.

14. The method of claim 13, wherein said connection mechanism provides a removable hinge between the upper connection protuberances and the lower connection protuberances in a manner that affixes the interacted and nested protuberances and when removed will allow the upper section to be removed from the lower section.

15. The method of claim 14, wherein said connection mechanism further is selected from a group comprising: a connection pin; a cotter pin; a hitch pin; and a clevis pin.

* * * * *